3,203,933
PROCESS FOR PREPARING POLYAMIDES FROM AROMATIC AMINO ACIDS

William A. H. Huffman and Ralph W. Smith, Durham, and William T. Dye, Jr., Chapel Hill, N.C., assignors, by mesne assignments, to Monsanto Company, a corporation of Delaware
No Drawing. Filed Oct. 18, 1961, Ser. No. 146,011
10 Claims. (Cl. 260—78)

This invention relates to new synthetic linear condensation polymers. More particularly, the invention relates to polymers prepared from aromatic monomers containing functional groups attached directly to the ring and to their preparation.

Prior to this invention, high molecular weight homopolymers from monomers having both functional groups in the same molecule have been obtained only in the aliphatic series. In the case of aromatic polymers molecular weight and yields were low, and simpler techniques and less expensive aliphatic monomers were known to produce polymers of equal or higher molecular weight. For example, high molecular weight fiber-forming polyamides from purely aromatic amino acids in which both the amino and the acid radicals are attached directly to the benzene ring have never been shown in the prior art.

Accordingly, it is an object of the present invention to produce new compositions of matter. Another object of the invention is to provide high molecular weight filament and fiber-forming polymers from aromatic monomers where both the amino and the other reactive substituent are attached directly to the ring. A further object of the invention is to provide a new class of polymers having high stability to degradative conditions such as solvents, high temperatures, hydrolytic agents, high energy radiation and other similar degradative conditions. Still another object is to provide a process for the preparation of polymers from aromatic monomers wherein both the amino and the other reactive substituent are attached directly to the aromatic nucleus. Other objects and advantages will be apparent from the description hereinafter.

In general, the objects of the invention are accomplished by preparing a polymerization environment which may be referred to as a basic emulsion or suspension containing a proton acceptor to which the monomer is added and the homopolymerization completed shortly thereafter. The polymerization may be of the solution or of the emulsion, also called interfacial, type and is conducted at room temperature or at a temperature as low as $-20°$ C. The aromatic monomers from which the aromatic polymers of the invention may be prepared are the amine salts of aromatic acid halides and the amine salts of aromatic sulfonyl halides. From such monomers by the polymerization process of this invention, polyamides and polysulfonamides of high molecular weight and stability may be prepared.

For interfacial or emulsion polymerization a suitable blending apparatus is selected and water added. The amount of water added is based on the amount of monomer employed and may conveniently vary from 8 to 12 parts per part monomer, preferably 10 parts water per part monomer. A proton acceptor is then added in the amount of an excess of the quantity needed to neutralize the acid by-product of polymerization as formed. From .01 to .05 part, based on monomer parts, of an emulsifying agent, preferably .025 part is blended therein. From 2 to 4 parts, preferably 3 parts of a monomer suspension medium may be added prior to the addition of the monomer itself, if desired. The emulsion is subjected to rapid stirring and the monomer suspended in a suitable suspension medium is added. The stirring is continued at high speed for 10 to 15 minutes, and the resulting polymer isolated, preferably by filtration, washing and drying.

The suspension medium suitably includes tetrahydrofuran, chlorinated hydrocarbons such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and benzene, tetrahydrofuran and acetophenone or benzene and acetone and the like. It has been found that a mixture of about 1 part tetrahydrofuran and 2 parts benzonitrile per part by weight of monomer is preferred for high molecular weight polymer. This suspension medium allows easy transfer of monomer to the basic emulsion and at the same time aids in keeping the polymer highly swollen during polymerization.

Suitable emulsifying agents include anionic and nonionic compounds such as sodium lauryl sulfate, nonylphenoxy (ethyleneoxy) ethane, the sodium or potassium salt of any suitable condensed sulfonic acid and the like.

A proton acceptor as the term is employed herein indicates a compound which acts as an acid scavenger to neutralize HCl as formed during the reaction and keeps the reaction going until completion. The pH range of the reaction mixture must be properly maintained between 6 and 10 during the reaction. Suitable proton acceptors include sodium carbonate, magnesium carbonate, calcium carbonate, tertiary amines such as triethyl amine, trimethyl amine and tripropyl amine and the like.

Alternatively, the polymers of this invention may be prepared by solution polymerization. In solution polymerization a suitable solvent selected from the group consisting of dimethylacetamide, 1-methyl-2-pyrrolidinone and 1,5-dimethyl-2-pyrrolidone is placed preferably in a 3-neck vessel equipped with a paddle stirrer, thermometer and drying tube. A small amount of lithium chloride, magnesium chloride or other alkali or alkaline earth salts may also be added to increase solvent activity for high monomer concentrations. Approximately 3 parts solvent per part monomer by weight may be utilized. The proton acceptor, in an amount necessary to neutralize acid as formed, is either dissolved or suspended in this solvent. The resulting basic emulsion is cooled to from about $5°$ C. to $-20°$ C. The monomer is then added thereto as a solid or in a minimum quantity of an inert suspension medium. Stirring is employed until the heat of reaction has subsided and the emulsion becomes viscous. The polymer may be isolated by any suitable means.

Suitable monomers which may be polymerized to produce the high molecular weight polymers of the present invention include compounds having the general formula (I) 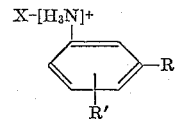

wherein X is taken from the group consisting of chlorine, bromine, sulfate and arylsulfonate, R is taken from the group consisting of carbonyl halide and sulfonyl halide, and wherein R' is any radical or group which is inert in the polymerization reaction such as hydrogen, halogen, aryl, nitro or an alkyl radical containing from 1 to 3 carbon atoms. Thus, it is possible by the process of this invention to produce aromatic polyamides and polysulfonamides which have both functional groups attached directly to the aromatic ring. It has been found that when employing the process of this invention the functional groups must be meta oriented with respect to each other. Ortho and para derivatives will not polymerize to high molecular weight polymers using the interfacial process described in the invention.

Suitable monomers having the general formula I which may be polymerized according to the present invention are the hydrohalide salts of aminobenzoyl halides and ring-substituted derivatives thereof, for example, m-aminobenzoyl chloride hydrochloride, m-aminobenzoyl bromide hydrochloride, m-aminobenzoyl chloride hydrobromide, m-aminobenzoyl bromide hydrobromide, 4-methyl-3-aminobenzoyl chloride hydrochloride, 4-chloro-3-aminobenzoyl chloride hydrochloride, 4-nitro-3-aminobenzoyl chloride hydrochloride, 5-methyl-3-aminobenzoyl chloride hydrochloride, 5-bromo-3-aminobenzoyl chloride hydrochloride, 4-methyl-3-aminobenzoyl chloride hydrobromide, 4-fluoro-3-aminobenzoyl chloride hydrobromide, 4-ethyl-3-aminobenzoyl chloride hydrobromide, 4-phenyl-3-aminobenzoyl chloride hydrobromide, 4-propyl-3-aminobenzoyl chloride hydrobromide, 4-benzoyl-3-aminobenzoyl chloride hydrobromide, 5-methyl-3-aminobenzoyl chloride hydrobromide, 5-ethyl-3-aminobenzoyl chloride hydrobromide, 5-propyl-3-aminobenzoyl chloride hydrobromide, 4-methyl-3-aminobenzoyl bromide hydrochloride, 4-ethyl-3-aminobenzoyl bromide hydrochloride, 5-methyl-3-aminobenzoyl bromide hydrochloride, 5-ethyl-3-aminobenzoyl bromide hydrochloride, 4-methyl-3-aminobenzoyl bromide hydrobromide, 4-ethyl-3-aminobenzoyl bromide hydrobromide, 5-methyl-3-aminobenzoyl bromide hydrobromide, 5-ethyl-3-aminobenzoyl bromide hydrobromide, 4-ethyl-3-aminobenzoyl chloride hydrochloride, 5-ethyl-3-aminobenzoyl chloride hydrochloride, and 6-propyl-3-aminobenzoyl chloride hydrochloride.

Further suitable monomers include the arylsulfonate salts of benzoyl halides, for example, 3-aminobenzoyl chloride p-toluenesulfonate, 3-aminabenzoyl chloride benzenesulfonate, 3-aminobenzoyl bromide p-toluenesulfonate, 3-aminobenzoyl bromide benzenesulfonate, 2-methyl-3-aminobenzoyl chloride benzenesulfonate, 2-ethyl-3-aminobenzoyl chloride benzenesulfonate, 2-methyl-3-aminobenzoyl bromide benzenesulfonate, 2-ethyl-3-aminobenzoyl bromide benzenesulfonate, 4-methyl-3-aminobenzoyl chloride benzenesulfonate, 4-ethyl-3-aminobenzoyl chloride benzenesulfonate, 4-methyl-3-aminobenzoyl bromide benzenesulfonate, 5-methyl-3-aminobenzoyl chloride p-toluenesulfonate, 5-methyl-3-aminobenzoyl bromide benzenesulfonate, 5-ethyl-3-aminobenzoyl bromide benzenesulfonate, 5-methyl-3-aminobenzoyl chloride benzenesulfonate and 6-methyl-3-aminobenzoyl bromide benzenesulfonate.

Other suitable monomers include the amine hydrohalide salts of benzenesulfonyl halides, for example, 3-aminobenzenesulfonyl chloride hydrocloride, 2-methyl-3-amniobenzenesulfonyl chloride hydrochloride, 2-ethyl-3-aminobenzenesulfonyl chloride hydrochloride, 4-methyl-3-aminobenzenesulfonyl chloride hydrochloride, 4-ethyl-3-aminobenzenesulfonyl chloride hydrochloride, 5-ethyl-3-aminobenzenesulfonyl chloride hydrochloride, 5-methyl-3-aminobenzenesulfonyl chloride hydrochloride, 4-methyl-3-aminobenzenesulfonyl bromide hydrochloride and 5-ethyl-3-aminobenzenesulfonyl bromide hydrochloride.

Other suitable monomers include the arylsulfonate salts of benzene sulfonyl halides, for example 3-aminobenzenesulfonyl bromide p-toluenesulfonate, 3-aminobenzenesulfonyl chloride p-toluenesulfonate, 2-methyl-3-aminobenzenesulfonyl chloride p-toluenesulfonate, 2-ethyl-3-aminobenzenesulfonyl chloride p-toluenesulfonate, 5-ethyl-3-aminobenzenesulfonyl chloride p-toluenesulfonate, 4-methyl-3-aminobenzenesulfonyl chloride p-toluenesulfonate, 5-methyl-3-aminobenzenesulfonyl chloride p-toluenesulfonate, 6-methyl-3-aminobenzenesulfonyl chloride p-toluenesulfonate, 3-methyl-3-aminobenzenesulfonyl chloride p-toluenesulfonate and 5-propyl-3-aminobenzenesulfonyl chloride p-toluenesulfonate.

These monomers may be prepared, in general, by using a thionyl chloride process or any other suitable method known in the art. For example, aminobenzoyl chloride hydrochloride may be prepared by treating aminobenzoic acid with thionyl chloride at reflux to form thionyl aminobenzoyl chloride which is reacted with hydrochloric acid in ether to form aminobenzoyl chloride hydrochloride. Amino benzene sulfonic acid may be reacted with thionyl chloride and a catalytic amount of dimethyl formamide to form thionyl aminobenzenesulfonyl chloride which is treated with hydrogen chloride and ether to form aminobenzenesulfonyl chloride hydrochloride.

The polymers of this invention may be represented by the general formula (II)
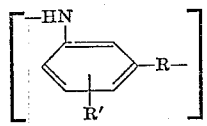

wherein R is selected from the group consisting of carbonyl and sulfonyl and R' is selected from the group consisting of hydrogen, halogen, aryl, nitro and alkyl radicals containing from 1 to 3 carbon atoms. For example, where R is carbonyl polyamides having the general formula

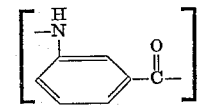

can be prepared. Where R is sulfonyl polysulfonamides having the general formula

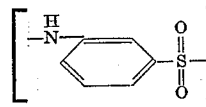

can be prepared. Further polymers contemplated by the general formula of this invention include polyamides and polysulfonamides wherein the benzene ring is substituted by suitable radicals or groups which are inert in the polymerization reaction such as those enumerated above. The outstanding feature in every example is the direct bonding of both functional groups to the aromatic nucleus which produces the high molecular weight and high melting polymers of this invention.

The polymers of this invention may be prepared in molecular weights of from about 10,000 to 50,000 or higher which are suitable for films, fibers, filaments and other shaped articles. Such polymers have a softening point range of from about 410 to 460° C. or higher, with average softening points of three or more samples varying from 425 to 440° C., as determined by differential thermal analysis. The inherent viscosity of the polymers of the invention is excellent with some measurements over 2.0, indicating very high molecular weight. Inherent viscosity measurements are obtained by the formula $$\text{Inh.} = \frac{\ln \eta \text{ rel.}}{C}$$

in which C is the concentration of the polymer per 100 ml. of solution and $\ln \eta$ rel. is the natural logarithm of the viscosity of a dilute solution, 0.5 concentration, of the polymer in a solvent divided by the viscosity of this solvent alone in the same units and at the same temperature, 25° C.

It is also possible by the process of this invention to prepare copolymers and blends of the polymers of this invention with any amount, preferably 10 to 15 percent, of suitable copolymerizable difunctional compounds. For example, aromatic and aliphatic polyamides based on diamines and diacid chlorides or aminoacid chloride hydrochlorides such as polyhexamethylene terephthalamide, polyhexamethylene adipamide, polyhexamethylene sebacamide, poly-m-phenylene isophthalamide and the polyamide of 2,4-toluene diamine and isophthaloyl chloride may be copolymerized or blended with poly-m-benzamide or poly-m-sulfonamide to produce polymers for various end uses.

For the production of filaments and fibers from the polymers of the invention solutions of at least 15 to 16 percent solids and up to 40% may be employed. These fibers have excellent textile properties. Elongation ranges from about 15 to 25%. Tenacity averages around 6 grams per denier with some individual breaks as high as 10 grams per denier.

The polymers of this invention are useful in a wide variety of shapes and forms. Fibers and filaments produced from such polymers have excellent tenacity and heat resistance characteristics which render them highly desirable for use in many commercial applications such as heat resistant filters, electric insulations, hoses, brake linings, parachutes, tires and various fireproof compositions. As films, such polymers may be employed in a large variety of lining and coating end uses requiring prolonged resistance to high temperatures, acids, hydrolytic agents and other degradative conditions.

The invention is further illustrated by the following examples in which all parts and percents are by weight unless otherwise indicated.

Example I

To a 500 ml. container 75 ml. water, 4.24 gm. sodium carbonate, 0.2 gm. sodium lauryl sulfate and 25 ml. acetone were added. To this rapidly stirred emulsion was added 7.86 gm. of m-aminobenzoyl chloride hydrochloride suspended in a mixture of 18 ml. benzene and 9 ml. acetone. Stirring was continued for 10 min. to insure complete polymerization. The polymer was washed and dried and had an inherent viscosity of 0.456 and a melting point of about 420 to 424° C. with discoloration beginning at about 400° C.

Example II

In a 250 ml. container 2.1 gm. of lithium chloride was dissolved in 100 ml. dry distilled dimethyl acetamide and the solution cooled and maintained between −18 to −20° C. The solution was subjected to continuous stirring while 32.2 gm. of solid m-aminobenzoyl chloride hydrochloride was added, followed by 50 ml. of solvent containing lithium chloride, then 12.5 gm. calcium hydroxide. A temperature rise of 10–15° C. was noted. Stirring was continued for 30 min. while the mixture was heated to 70° C. The mixture was then cooled to 50° C. and poured into 2 liters of hot water. The resulting polymer yield when dried was 18.2 gm., 91% of the theoretical amount. Inherent viscosity was 0.324.

Example III

An emulsion was prepared using 150 ml. water, 10.6 gm. sodium carbonate, 15.0 grams sodium chloride, 1.0 gm. of nonyl phenoxy (ethyleneoxy) ethane, 0.25 gm. of the sodium salt of a sulfonic acid and 0.25 gm. of sodium lauryl sulfate. 19.2 gm. of m-aminobenzoyl chloride HCl suspended in 175 ml. of redistilled tetrahydrofuran was added to the emulsion with rapid stirring. The mixture was stirred for 10 minutes, made acid with 1.0 N hydrochloric acid and filtered. The resultant polymer was washed with acetone and methanol and dried. A yield of 11.0 gm. was obtained. The inherent viscosity of the polymer at a 0.5% concentration in dimethyl acetamide containing 5% LiCl was 0.434.

Example IV

An emulsion was prepared by blending 100 ml. water, 5.3 gm. sodium carbonate, 7.5 gm. sodium chloride, 0.12 gm. sodium lauryl sulfate, 0.12 gm. of the sodium salt of a sulfonic acid, and 0.5 gm. of nonyl phenoxy (ethyleneoxy) ethane. 10.2 gm. of 4-methyl-3-aminobenzoyl chloride hydrochloride suspended in 100 ml. of tetrahydrofuran was added to the emulsion with rapid stirring. The mixture was stirred rapidly for 10 min. and the resultant polymer isolated, washed and dried.

Example V

Into a 3 neck vessel were placed 235 ml. of 1-methyl-2-pyrrolidinone and 5.0 gm. lithium chloride. The reaction media was blanketed with nitrogen and cooled to −15° C. The mixture was stirred while 57.6 gm. of m-aminobenzoyl chloride hydrochloride was added. The temperature of the reaction mixture was maintained below −10° C. by the use of a Dry Ice acetone bath. The mixture was stirred for an additional 10 minutes and 22.2 gm. of calcium hydroxide added. Stirring was continued for 50 minutes at 10–12° C. resulting in the formation of a viscous dope. The mixture was heated and the polymer coagulated by pouring into hot water. A yield of 33.0 gm. representing 92.5% of the theoretical amount was obtained. The inherent viscosity of this polymer measured at 0.5% concentration in conc. sulfuric acid was 0.286.

Example VI

An interfacial polymerization of m-aminobenzoyl chloride hydrochloride was carried out by preparing an emulsion containing 75 ml. of water, 8.48 gm. sodium carbonate, 0.2 gm. sodium lauryl sulfate and 25 ml. tetrahydrofuran. To this rapidly stirred emulsion was added a suspension of 7.68 gm. m-aminobenzoyl chloride hydrochloride in 17.0 ml. benzonitrile and 9.0 ml. tetrahydrofuran. Stirring was continued for 10 min. and the resulting polymer isolated, washed and dried. The inherent viscosity of this polymer was 2.36. A 20% solution of this polymer in dimethyl acetamide containing 5% lithium chloride produced fibers by wet and dry spinning. High strength, drawable films were also produced.

Example VII 75 ml. of $H_2O$, 8.6 gm. sodium carbonate, 0.2 gm. of sodium lauryl sulfate, 25 ml. of tetrahydrofuran and 0.464 gm. of hexamethylene diamine were mixed and stirred rapidly while 0.692 gm. of m-aminobenzoyl chloride hydrochloride and 0.812 gm. of terephthaloyl chloride in 17 ml. of benzonitrile and 9 ml. of tetrahydrofuran were added. The mixture was stirred rapidly for 10 min. and the resulting polymer isolated, washed and dried. The polymer had a melting point of 380–385° C. A tough film was cast from a 16.6% solution of the polymer in dimethyl acetamide containing 5% lithium chloride.

Example VIII 75 ml. of $H_2O$, 8.6 gm. of sodium carbonate, 0.2 gm. of sodium lauryl sulfate, 25 ml. of tetrahydrofuran and 0.445 gm. of 2,4-toluene diamine were mixed and stirred rapidly while 6.92 gm. of m-aminobenzoyl chloride hydrochloride and 0.812 gm. of isophthaloyl chloride in 17.0 ml. of benzonitrile and 9.0 ml. of tetrahydrofuran were added. The mixture was stirred for 10 min. and the resulting polymer was isolated, washed and dried. The polymer had a melting point of 380–385° C. A strong film was cast from a 16.6% solution of the polymer in dimethyl acetamide containing 5% lithium chloride.

As many variations of this invention may be made without departing from the spirit and scope thereof it is to be understood that the invention is not limited to the specific embodiments thereof except as defined in the appended claims.

We claim:

1. A process for the preparation of wholly aromatic polyamides having the recurring structural unit

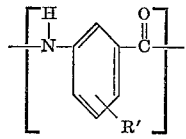

wherein R′ is selected from the group consisting of hydrogen and alkyl containing 1 to 3 carbon atoms comprising the steps of:

(1) mixing at least 8 parts water, based on parts per part monomer, a proton acceptor and an emulsifying agent to form a basic emulsion, (2) adding to said emulsion an aromatic monomer of the formula

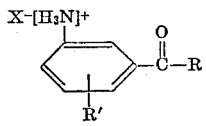

wherein X is selected from the group consisting of chlorine, bromine, sulfate and arylsulfonate, R represents a halide, and R' is selected from the group consisting of hydrogen and alkyl of 1 to 3 carbon atoms, in a suspension medium, (3) and stirring until a polymer having an inherent viscosity of at least 1.0 as measured from a solution of 0.5 gram of polymer dissolved in 100 ml. of dimethylacetamide containing 5 percent dissolved lithium chloride at 25° C. and a melting point of at least 350° C. is obtained.

2. The process of claim 1 wherein the suspension medium is a mixture of tetrahydrofuran and benzonitrile.

3. The process of claim 1 wherein the pH of the basic emulsion is from 6 to about 10.

4. The process of claim 1 wherein the proton acceptor is sodium carbonate.

5. The process of claim 1 wherein the proton acceptor is calcium carbonate.

6. The process of claim 1 wherein the proton acceptor is magnesium carbonate.

7. The process of claim 1 wherein the proton acceptor is triethyl amine.

8. The process of claim 1 wherein the emulsifying agent is sodium lauryl sulfate.

9. The process of claim 1 wherein the emulsifying agent is nonylphenoxy (ethyleneoxy) ethane.

10. A process for polymerizing m-aminobenzoyl chloride hydrochloride comprising mixing, based on parts by weight of m-aminobenzoyl chloride hydrochloride, 8 to 12 parts of water, .01 to .05 part of sodium lauryl sulfate, 2 to 4 parts of tetrahydrofuran and a molar excess of sodium carbonate to form a basic emulsion, adding to this basic emulsion one part of m-aminobenzoyl chloride hydrochloride suspended in benzonitrile and tetrahydrofuran and stirring until polymerization is complete.

References Cited by the Examiner

UNITED STATES PATENTS

| 2,688,011 | 8/54 | Wheatley et al. | 260—78 |
| 2,831,834 | 4/58 | Magat | 260—78 |
| 3,079,219 | 2/63 | King | 260—78 |
| 3,109,836 | 11/63 | Berry | 260—78 |

OTHER REFERENCES

Ser. No. 323,512, Hagedorn (A.P.C.), published Apr. 20, 1943 (now abandoned).

WILLIAM H. SHORT, *Primary Examiner.*

H. N. BURSTEIN, *Examiner.*